United States Patent
Pagano et al.

(10) Patent No.: US 7,078,449 B2
(45) Date of Patent: Jul. 18, 2006

(54) RUBBER COMPOSITIONS FOR USE IN TIRES, COMPRISING A (WHITE FILLER/ELASTOMER) COUPLING AGENT WITH AN ESTER FUNCTION

(75) Inventors: Salvatore Pagano, Chamalieres (FR); Christel Thonier, Mozac (FR); Gerard Mignani, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 259 days.

(21) Appl. No.: 10/184,653

(22) Filed: Jun. 28, 2002

(65) Prior Publication Data

US 2003/0065104 A1    Apr. 3, 2003

Related U.S. Application Data

(63) Continuation of application No. PCT/EP00/13292, filed on Dec. 27, 2000.

(30) Foreign Application Priority Data

Dec. 30, 1999 (FR) .................................. 99 16844

(51) Int. Cl.
  C08K 5/5425  (2006.01)
  C08K 3/36    (2006.01)
  C08F 36/04   (2006.01)
  B60C 5/00    (2006.01)

(52) U.S. Cl. ................. 524/264; 524/262; 524/269; 524/265; 524/492; 524/444; 524/437; 525/331.9; 152/209.1

(58) Field of Classification Search ................ 524/267, 524/261, 264, 262; 525/342, 331.9
See application file for complete search history.

(56) References Cited

U.S. PATENT DOCUMENTS

| | | | |
|---|---|---|---|
| 3,576,031 A * | 4/1971 | Holub et al. ............... 556/419 |
| 3,664,403 A   | 5/1972 | Doran et al. ............... 152/330 |
| 3,842,111 A   | 10/1974 | Meyer-Simon et al. .. 260/448.2 E |
| 3,873,489 A   | 3/1975 | Thurn et al. .......... 260/33.6 AQ |
| 3,941,741 A * | 3/1976 | De Zuba et al. ............ 524/262 |
| 3,978,103 A   | 8/1976 | Meyer-Simon et al. .. 260/448.8 R |
| 3,997,581 A   | 12/1976 | Pletka et al. ......... 260/448.8 R |
| 4,075,167 A * | 2/1978 | Takamizawa et al. ......... 528/32 |
| 4,975,509 A * | 12/1990 | Joslyn et al. ................ 526/279 |
| 5,319,047 A * | 6/1994 | Wideman et al. ............ 526/304 |
| 5,328,963 A * | 7/1994 | Muse et al. .................. 525/282 |
| 5,457,145 A * | 10/1995 | Moro et al. .................. 524/188 |
| 5,484,848 A * | 1/1996 | Jadamus et al. ............. 525/105 |
| 5,637,629 A * | 6/1997 | Moro et al. .................. 523/203 |
| 5,652,310 A   | 7/1997 | Hsu et al. ................. 525/331.9 |
| 5,684,171 A   | 11/1997 | Wideman et al. ........... 556/427 |
| 5,684,172 A   | 11/1997 | Wideman et al. ........... 556/427 |
| 5,696,188 A * | 12/1997 | D'Sidocky et al. ......... 524/219 |
| 5,698,620 A * | 12/1997 | Wideman et al. ........... 524/270 |
| 5,981,637 A * | 11/1999 | Blok et al. .................. 524/219 |
| 2003/0144393 A1* | 7/2003 | Barruel et al. .............. 524/261 |
| 2003/0144403 A1* | 7/2003 | Barruel et al. .............. 524/492 |
| 2004/0249048 A1 | 12/2004 | Mangeret et al. |

FOREIGN PATENT DOCUMENTS

| | | |
|---|---|---|
| EP | 0370551 | 5/1990 |
| EP | 0501227 | 9/1992 |
| EP | 0735088 | 10/1996 |
| EP | 0810258 | 12/1997 |
| FR | 2 094 859 | 2/1972 |
| FR | 2 206 330 | 7/1974 |
| GB | 1 310 379 | 3/1973 |
| GB | 1 439 247 | 6/1976 |
| JP | 64-29385 A | 1/1989 |
| WO | 0149694 | 7/2001 |
| WO | WO 01/49781 A1 * | 7/2001 |

* cited by examiner

Primary Examiner—Ling-Sui Choi
Assistant Examiner—Rip A Lee
(74) Attorney, Agent, or Firm—Buchanan Ingersoll PC (57) ABSTRACT

The present invention is directed to a rubber composition comprising a diene elastomer, a reinforcing white filler, and a (white filler/elastomer) coupling agent, which is bifunctional and which can be bonded to the elastomer by means of a function X. The coupling agent X function is an ester function of an unsaturated α-β acid bearing a carbonyl group on its γ position and having the general formula (X):

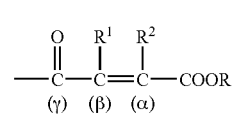

where R, $R^1$ and $R^2$ may be the same or different, where R is a monovalent hydrocarbon radical, and where $R^1$ and $R^2$ may be a hydrogen atom or a monovalent hydrocarbon radical. The rubber composition of the present invention is useful for the manufacture of tires or semi-finished products for tires, such as tire treads.

30 Claims, 3 Drawing Sheets

RUBBER COMPOSITIONS FOR USE IN TIRES, COMPRISING A (WHITE FILLER/ELASTOMER) COUPLING AGENT WITH AN ESTER FUNCTION

CROSS-REFERENCE TO RELATED APPLICATIONS

This application is a continuation of International Application Number PCT/EP00/13292, published in French on Jul. 12, 2001 as International Publication Number WO 01/49782 A1 and filed on Dec. 27, 2000, which claims priority to French Patent Application Number 99/16844, filed on Dec. 30, 1999.

FIELD OF THE INVENTION

The present invention relates to diene rubber compositions reinforced with a white filler, which are intended in particular for the manufacture of tires or semi-finished products for tires, and in particular to treads for these tires.

BACKGROUND OF THE INVENTION

Since fuel economies and the need to protect the environment have become priorities, it has become desirable to produce elastomers with good mechanical properties and as low a hysteresis as possible so that they can be used in the form of rubber compositions that are useful in the manufacture of various semi-finished products for tires, such as underlayers, calendering or sidewall rubbers, or treads, and are useful in obtaining tires with improved properties, such as reduced rolling resistance.

To achieve such an objective, numerous solutions have been proposed. First of all, some solutions essentially concentrate on the use of elastomers that have been modified by agents such as coupling, starring or functionalizing agents, where carbon black is used as the reinforcing filler, with the aim of obtaining a good interaction between the modified elastomer and the carbon black. It is generally known that in order to obtain the optimum reinforcement properties imparted by a filler, the filler should be present in the elastomeric matrix in a final form which is both as finely divided as possible and distributed as homogenously as possible. Such conditions can only be realized insofar as the filler has a good ability firstly to disagglomerate and be incorporated in the matrix during mixing, and on the other hand to be dispersed homogeneously in the elastomer.

It is well known that carbon black has such abilities, which is generally not true of white fillers. For reasons of mutual attraction, white filler particles have a tendency to agglomerate together within the elastomeric matrix. These interactions have the harmful consequence of limiting the dispersion of the filler and hence its reinforcing properties to a substantially lower level than that which would be theoretically possible if all of the (white filler/elastomer) bonds that could be created during the mixing operation were in fact obtained. In addition, these interactions tend to increase the consistency of the rubber compositions in the uncured state and to make them more difficult to work ("processability") than in the presence of carbon black.

However, interest in rubber compositions reinforced with white filler was greatly revived with the publication of European Patent Application EP 0 501 227, which discloses a sulfur-vulcanizable diene rubber composition, reinforced with a special precipitated silica of the highly dispersible type, which makes it possible to manufacture a tire or tread with substantially improved rolling resistance, without adversely affecting the other properties, in particular the properties of grip, endurance and wear resistance.

Additionally, Europe Patent Application EP 0 810 258 discloses a diene rubber composition reinforced with another particular white filler, in this case a specific alumina ($Al_2O_3$) with high dispersibility, from which tires or treads that show an excellent compromise between contradictory properties can also be made.

Although the use of these specific, highly dispersible silicas or aluminas as reinforcing fillers has certainly reduced the difficulty of processing the rubber compositions that contain them, they are still more difficult to process than-rubber compositions filled conventionally with carbon black.

In particular, it is necessary to use a coupling agent, also known as a bonding agent, the function of which is to provide the connection between the surface of the white filler particles and the elastomer, while also facilitating the dispersion of this white filler within the elastomeric matrix.

The term "coupling agent" (white filler/elastomer) is understood, as is known, to mean an agent capable of establishing a sufficient chemical and/or physical bond between the white filler and the diene elastomer; such a coupling agent, which is at least bifunctional, has, for example, a simplified general formula "Y—W—X" in which:

Y represents a functional group ("Y" function) which is capable of bonding physically and/or chemically with the white filler, such a bond being able to be established, for example, between a silicon atom of the coupling agent and the hydroxyl (OH) surface groups of the white filler (for example, surface silanols in the case of silica);

X represents a functional group ("X" function) capable of bonding physically and/or chemically to the diene elastomer, for example, by means of sulfur atom; and W represents a hydrocarbon group connecting Y and X.

In particular, coupling agents should not be confused with simple agents for covering the white filler which, as is known, may comprise the Y function that is active with respect to the white filler, but do not have the X function which is active with respect to the diene elastomer.

Coupling agents, notably (silica/diene elastomer) agents, have been described in numerous documents, the best known being bifunctional alkoxysilanes.

Thus, in French Patent Application FR 2 094 859, it was proposed to use a mercaptosilane coupling agent for the manufacture of tire treads. It was quickly discovered, and is today well known, that the mercaptosilanes, and in particular γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functional groups, which very rapidly results in premature vulcanization during the preparation of the rubber composition in an internal mixer. This is also known as "scorching," which results in very high Mooney plasticity values and results in rubber compositions which are virtually impossible to work and process industrially. To illustrate the impossibility of using such coupling agents bearing —SH functional groups and the rubber compositions that contain them industrially, the documents FR 2 206 330 and U.S. Pat. No. 4,002,594 may be referred to.

To overcome this drawback, it has been proposed to replace these mercaptosilanes by polysulfurized alkoxysilanes, in particular bis-trialkoxy($C_1$–$C_4$)silylpropyl polysulfides such as those described in numerous patents or patent applications (such as, for example, FR 2 206 330, and U.S. Pat. Nos. 3,842,111, 3,873,489, 3,978,103 or 3,997,581). These polysulfurized alkoxysilanes are now generally regarded as the products which, in the case of vulcanizates filled with silica, give the best compromise with regard to scorching resistance, processability and reinforcing power. Among these polysulfides, mention should be made of bis-3-triethoxysilylpropyl tetrasulfide (abbreviated to TESPT), which is the (white filler/diene elastomer) coupling agent currently recognized as the most effective, and is therefore the one most widely used today in rubber compositions for tires, notably those compositions intended for tire treads. TESPT is commercially available, for example, under the name "Si69" from the company Degussa. However, this product has the known disadvantage that it is very costly and usually has to be used in relatively large amounts. (See, for example, U.S. Pat. Nos. 5,652,310; 5,684,171; and 5,684,172.)

SUMMARY OF THE INVENTION

It has been discovered that specific coupling agents bearing a particular activated ethylenic double bond can show coupling performances superior to those of the polysulfurized alkoxysilanes in rubber compositions for tires, notably to the performance of TESPT. In addition, these specific coupling agents do not give rise to the aforesaid premature scorching problems and processing problems linked to excessive viscosity of the rubber compositions in the uncured state, namely to the disadvantages associated with mercaptosilanes.

Alkoxysilanes with an activated ethylenic double bond have already been described, notably in rubber compositions for tires (see, for example, the patent application JP 1989/29385), but until now these coupling agents have always shown inadequate coupling performances, or performances clearly inferior to those offered by the polysulfurized alkoxysilanes of the TESPT type.

Consequently, a first object of the present invention relates to a rubber composition that can be vulcanized with sulfur, which can be used to manufacture tires and which is based on at least one diene elastomer (referred to herein as component A); a white filler as a reinforcing filler (referred to herein as component B); a (white filler/elastomer) coupling agent (referred to herein as component C), bearing at least two functions denoted as "Y" and "X", which can be bonded on the one hand to the white filler by means of the Y function and on the other hand to the elastomer by means of the X function, wherein the X function of the coupling agent is an ester function of an unsaturated α-β acid bearing a carbonyl group on its γ position and having general formula (X):

(X)

wherein R, R¹ and R², which may be identical or different, each represent a monovalent hydrocarbon radical or, in the case of R¹ and R², can also represent a hydrogen atom.

Another object of the present invention is the use of the rubber composition according to the invention in the manufacture of tires or semi-finished products intended for such tires, where the semi-finished products may be selected from the group consisting of treads, underlayers intended, for example, to be positioned beneath these treads, crown plies, sidewalls, carcass plies, beads, protectors, inner tubes and airtight internal rubbers for tubeless tires.

The present invention is also directed to tires and semi-finished products intended for such tires, wherein they comprise the rubber composition according to the invention.

In particular, the invention concerns tire treads that are useful in the manufacture of new tires or for the recapping of worn tires. Because of the rubber compositions according to the present invention, the treads show both low rolling resistance and high wear resistance.

The invention also relates to a process for preparing a rubber composition that is useful in the manufacture of tires comprising providing a mixture of:

(i)—at least one diene elastomer (component A);
(ii)—at least one white filler as a reinforcing filler (component B); and
(iii)—a (white filler/diene elastomer) coupling agent (component C), bearing at least two functions denoted "Y" and "X," which can be bonded on the one hand to the white filler by means of the Y function and on the other hand to the elastomer by means of the X function, wherein the X function is an ester function of an unsaturated α-β acid bearing a carbonyl group on its γ position and having the general formula (X):

(X)

wherein R, R¹ and R², which may be identical or different, each represent a monovalent hydrocarbon radical or, in the case of R¹ and R², can also represent a hydrogen atom, and kneading the entire mixture thermo-mechanically in one or more stages until a maximum temperature of between about 110° C. and 190° C. is reached.

Another object of the present invention is the use, as a (white filler/elastomer) coupling agent in a rubber composition based on a diene elastomer reinforced with a white filler, of a compound (component C) bearing at least two functions denoted "Y" and "X," which can be bonded on the one hand to the white filler by means of the Y function and on the other hand to the elastomer by means of the X function, the X function being an ester function of an unsaturated α-β acid bearing a carbonyl group on its γ position and having the general formula (X) stated above.

Finally, an object of the present invention involves a process for coupling a white filler and a diene elastomer in a rubber composition that is useful in the manufacture of tires, wherein the process comprises providing a mixture of:

(i)—at least one diene elastomer (component A);
(ii)—at least one white filler as a reinforcing filler (component B); and
(iii)—a (white filler/diene elastomer) coupling agent (component C), bearing at least two functions denoted "Y" and "X," which can be bonded on the one hand to the white filler by means of the Y function and on the other hand to the elastomer by means of the X function, the X function being an ester function of an unsaturated α-β acid bearing a carbonyl group on its γ position and having as its general formula the formula (X) stated above, and, kneading the entire mixture thermo-mechanically in one or more stages until a maximum temperature of between about 110° C. and 190° C. is reached.

BRIEF DESCRIPTION OF THE DRAWINGS

The invention and its advantages will be readily understood in the light of the description and example embodiments which follow, and of the accompanying drawings, wherein.

DETAILED DESCRIPTION OF THE INVENTION

The present invention is further described below with respect to certain specific embodiments.

The measurements made and tests used to characterize the rubber compositions of the present invention are described below. The rubber compositions are characterized before and after curing, as indicated below.

Mooney Plasticity Test: An oscillating consistometer such as that described in standard AFNOR-NFT-43005 (November 1980) is used. The Mooney plasticity is measured in accordance with the following principle: the composition in the raw state (i.e., before curing) is cast into a cylindrical mold heated to 100° C. After preheating for one minute, the rotor turns within the sample at 2 rpm, and the torque used to sustain this movement after four minutes of rotation is measured. The Mooney plasticity (ML 1+4) is expressed in "Mooney units" (MU, where 1 MU=0.83 Newton meters).

Scorching Time Test: The measurements are effected at 130° C., in accordance with Standard AFNOR-NFT-43004 (November 1980). The evolution of the consistometric index as a function of time makes it possible to determine the scorching time for the rubber compositions, assessed in accordance with the above standard, by the parameter T5, which is expressed in minutes and is defined as the time necessary to obtain an increase in the consistometric index (expressed in MU) of 5 units above the minimum value measured for this index.

Tensile Tests: These tests make it possible to determine the elasticity stresses and the properties at break. Unless otherwise indicated, these tests are effected in accordance with the Standard AFNOR-NFT-46002 of September 1988.

The nominal secant moduli (in MPa) at 10% elongation (M10), at 100% elongation (M100), and at 300% elongation (M300) are measured in a second elongation (i.e. after an accommodation cycle). The breaking stresses (in MPa) and the elongations at break (in %) are also measured. All of these tensile measurements are effected under normal conditions of temperature and humidity in accordance with the Standard AFNOR-NFT-40101 (December 1979).

Figure 1:
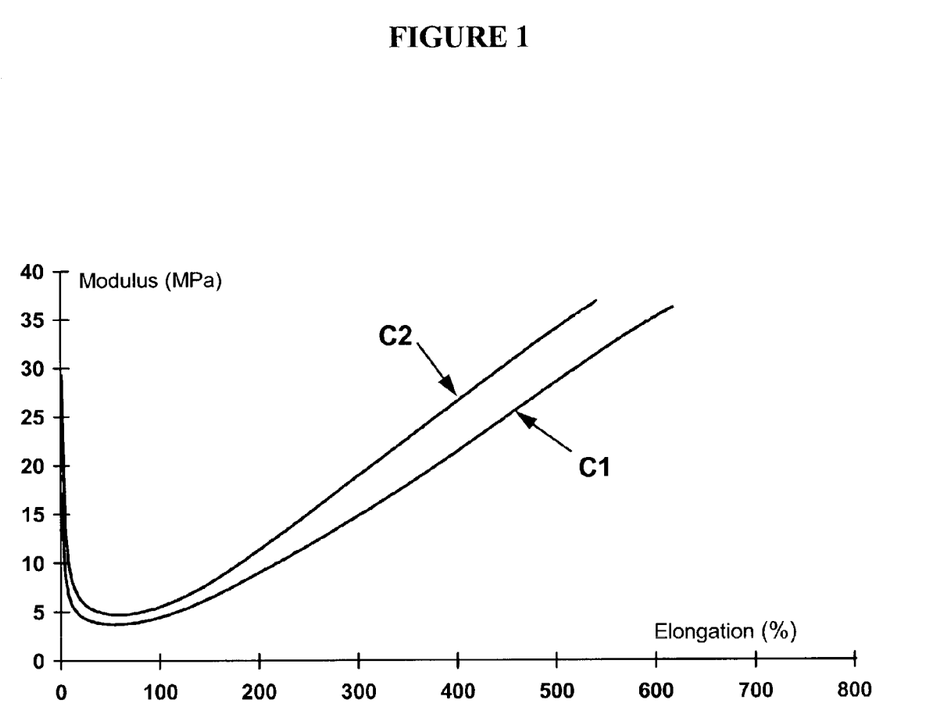
FIG. 1 shows curves of the variation of modulus as a function of elongation for a rubber composition (C1) comprising TESPT as the coupling agent and a rubber composition according to the present invention (C2) comprising the methyl ester of N-[γ-propyl(methyl-diethoxy)silane] maleamic acid as the coupling agent.
Figure 2:
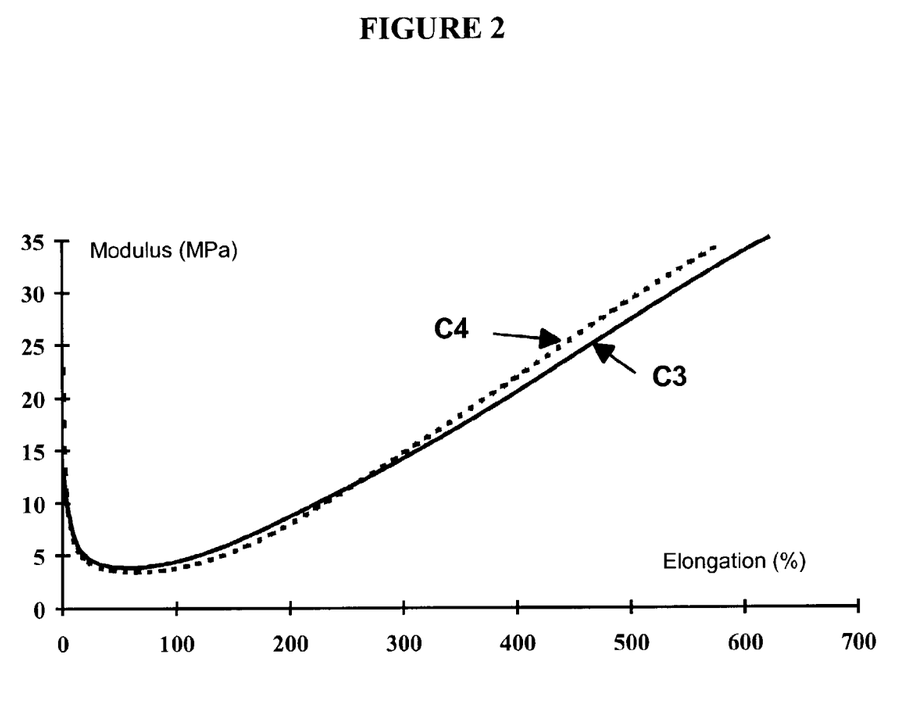
FIG. 2 shows curves of the variation of modulus as a function of elongation for a rubber composition (C3) comprising TESPT as the coupling agent and a rubber composition according to the present invention (C4) comprising a coupling agent with a maleamic ester function, where a blend of silica and alumina is used as the reinforcing white filler.
Figure 3:
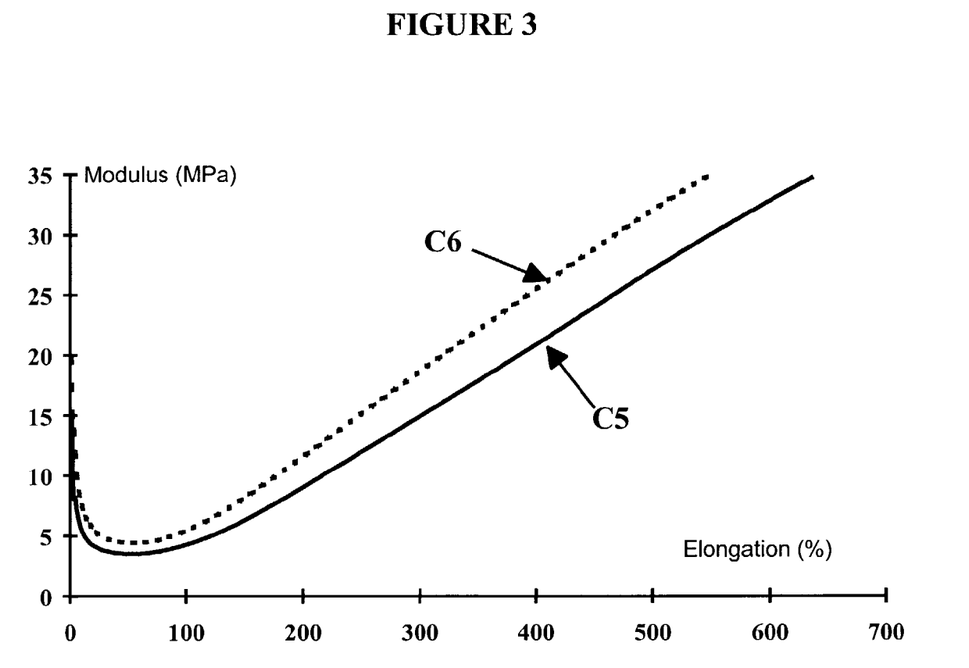
FIG. 3 shows curves of the variation of modulus as a function of elongation for a rubber composition (C5) comprising TESPT as the coupling agent and a rubber composition according to the present invention (C6) comprising a coupling agent with a maleamic ester function as well as a polyorganosiloxane.

Processing of the tensile data recorded also makes it possible to trace the curve of the modulus as a function of the elongation as shown in FIGS. 1–3, described in more detail below. The modulus used here is the true secant modulus measured in a first elongation, calculated with reference to the actual cross-section of the test piece and not to the initial section as previously for the nominal moduli.

The rubber compositions of the present invention are based on at least each of the following constituents: (i) at least one diene elastomer (component A, defined in more detail below), (ii) at least one white filler as a reinforcing filler (component B), and (iii) at least one specific compound (component C, defined in more detail below) which acts as the (white filler/diene elastomer) coupling agent.

The expression "composition based on" means a composition comprising the mixture and/or the reaction products of the various constituents used, formed in situ, where some of these constituents are able or are intended to react with one another, at least partially, during the various phases of the processing of the composition, in particular during its vulcanization.

As is known, the term "diene" elastomer or rubber is understood to mean an elastomer obtained at least in part (i.e., a homopolymer or a copolymer) from diene monomers, i.e., monomers bearing two double carbon-carbon bonds, whether conjugated or not.

Generally, "essentially unsaturated" diene elastomer is understood here to mean a diene elastomer obtained at least in part from conjugated diene monomers, having a content of members or units of diene origin (conjugated dienes) which is greater than 15% (mole %).

Although applicable to any type of diene elastomer, a person familiar with the field of tire manufacture will understand that the present invention is used first and foremost with essentially unsaturated diene elastomers, in particular: (a) any homopolymer obtained by the polymerization of a conjugated diene monomer having 4 to 12 carbon atoms; or (b) any copolymer obtained by copolymerization of one or more dienes conjugated together or with one or more vinyl aromatic compounds having 8 to 20 carbon atoms.

Within the category of "essentially unsaturated" diene elastomers, "highly unsaturated" diene elastomer is understood to mean, in particular, a diene elastomer having a proportion of members of diene origin (conjugated dienes) which is greater than 50%.

Taking into account the above-described definitions, the diene elastomer (component A) of the composition according to the present invention is preferably chosen from the group which consists of the polybutadienes (BR), natural rubber (NR), synthetic polyisoprenes (IR), the various copolymers of butadiene, the various copolymers of isoprene, and mixtures of these elastomers.

In the above group, the copolymers of butadiene or isoprene are preferably chosen from among the copolymers of butadiene-styrene, the copolymers of butadiene-isoprene, the copolymers of isoprene-styrene, the copolymers of butadiene-styrene-isoprene, and mixtures of these copolymers.

Among the polybutadienes, the most suitable are those having a content of -1,2 units between 4% and 80%, or those having a content of cis-1,4 higher than 80%. Among the synthetic polyisoprenes, the most suitable are the cis-1,4 polyisoprenes.

Among the copolymers of butadiene or isoprene, the most suitable are the copolymers obtained by the copolymerization of at least one of these two monomers with one or more vinyl-aromatic compounds having 8 to 20 carbon atoms. Suitable vinyl-aromatic compounds are, for example, styrene, ortho-, meta- and para-methylstyrene, the commercial mixture "vinyl-toluene," para-tertiobutylstyrene, the methoxy-styrenes, the chloro-styrenes, vinylmesitylene, divinylbenzene and vinylnaphthalene. The copolymers may contain between 99% and 20% by weight of diene units and between 1% and 80% by weight of vinyl-aromatic units.

Among the copolymers of butadiene, particular mention can be made of the copolymers of butadiene-styrene (known as "SBR"), the copolymers of butadiene-isoprene (BIR), and those of butadiene-styrene-isoprene (SBIR). Among the copolymers of isoprene, particular mention can be made of the copolymers of isobutene-isoprene (butyl rubber—IIR), those of isoprene-styrene (SIR), and the copolymers of isoprene-butadiene (BIR) or of isoprene-butadiene-styrene (SBIR) mentioned earlier.

Among the copolymers of butadiene-styrene-isoprene, those suitable in particular are the ones having: a styrene content of between 5% and 50% by weight and, more particularly, between 20% and 40%; a content of -1,2 bonds of the butadiene part of between 4% and 65%; and a content of trans-1,4 units between 20% and 80%. Among the copolymers of butadiene-isoprene, the most suitable are those having an isoprene content of between 5% and 90% by weight and a glass transition temperature ($T_g$) of between about −40° C. and −80° C. As for the isoprene-styrene copolymers, the most suitable are those having a styrene content of between 5% and 50% by weight and a $T_g$ of between −25° C. to −50° C. In the case of the copolymers of butadiene-styrene-isoprene, the most suitable are those with: a styrene content between 5% and 50% by weight and more particularly between 10% and 40%; an isoprene content between 15% and 60% by weight and more particularly between 20% and 50%; a butadiene content between 5% and 50% by weight and more particularly between 20% and 40%; a content of -1,2 units of the butadiene part between 4% and 85%; a content of trans-1,4 units of the butadiene part between 6% and 80%; a content of -1,2 plus -3,4 units of the isoprene part between 5% and 70%; and a content of trans-1,4 units of the isoprene part between 10% and 50%. More generally, any butadiene-styrene-isoprene copolymer with a $T_g$ of between −20° C. and −70° C. are suitable.

Thus, as component A, a diene elastomer is particularly suitable which has been chosen from the group of highly unsaturated diene elastomers consisting of the polybutadienes, natural rubber, the synthetic polyisoprenes, the copolymers of butadiene-styrene, the copolymers of butadiene-isoprene, the copolymers of isoprene-styrene, the copolymers of butadiene-styrene-isoprene, and mixtures of these elastomers.

The diene elastomer chosen may have any microstructure that is a function of the polymerization conditions used, in particular of the presence or absence of a modifying and/or randomizing agent and the quantities of modifying and/or randomizing agent used. It may, for example, be a block, statistical, sequenced or microsequenced elastomer, and it may be prepared in a dispersion or in solution; the elastomer may be coupled and/or starred, or alternatively functionalized with a coupling and/or starring or functionalizing agent.

The composition according to the invention is particularly intended for a tire tread, whether this be for a new tire or for a worn tire (recapping).

In the case of a passenger-car tire, the component A is, for example, an SBR or a blend (mixture) of SBR/BR, SBR/NR (or SBR/IR), or even BR/NR (or BR/IR). In the case of an SBR elastomer, an SBR in particular is used having: a styrene content between 20% and 30% by weight; a content of vinyl bonds of the butadiene part between 15% and 65%; a content of trans-1,4 bonds between 15% and 75%; and a $T_g$ of between about −20° C. and −55° C., wherein the SBR copolymer, preferably prepared in solution, is used optionally in admixture with a polybutadiene (BR) preferably having over 90% of cis-1,4 bonds.

In the case of a tire for a utility vehicle, notably a "heavy duty" vehicle, such as a bus, road transport vehicles, lorries, tractors, trailers, off-road vehicles, and the like, the component A is chosen, for example, from the group consisting of natural rubber, the synthetic polyisoprenes, the copolymers of isoprene (isoprene-butadiene, isoprene-styrene, butadiene-styrene-isoprene), and mixtures of these elastomers. In such a case, the component A may also consist in whole or in part of another highly unsaturated elastomer such as an SBR elastomer.

The improvement of the coupling given by the present invention is particularly notable in compositions based on natural rubber or synthetic polyisoprene. By this is meant compositions of rubber in which the diene elastomer (component A) consists for the most part (i.e. more than 50% by weight) of natural rubber, synthetic polyisoprene or a mixture of these elastomers.

Advantageously, the component A may consist exclusively of natural rubber, synthetic polyisoprene or a mixture of these elastomers.

The compositions of the invention may contain, instead of component A as defined earlier, diene elastomers other than the component A, non-diene elastomers, or polymers other than elastomers, for example thermoplastic polymers.

The white filler used as the reinforcing filler (component B) may constitute all or only part of the total reinforcing filler, in the latter case associated, for example, with carbon black.

Preferably, in the rubber compositions of the present invention, the reinforcing white filler constitutes the majority, i.e. more than 50% by weight, of the total reinforcing filler, more preferably more than 80% by weight of this total reinforcing filler.

In the present application, the term "reinforcing white filler" means a "white" (i.e. inorganic or mineral) filler, whatever its color (as opposed to carbon black), which is sometimes also referred to as a "clear" filler, which is capable, on its own and without any means other than an intermediate coupling system, of reinforcing a rubber composition intended for the manufacture of tires. In other words, the "reinforcing white filler" is capable of replacing in its reinforcing function a conventional filler of tire-grade carbon black.

Preferably, the reinforcing white filler is a mineral filler of the silica type ($SiO_2$) or the alumina type ($Al_2O_3$), or a mixture of these two fillers.

The silica used may be any reinforcing silica known to those familiar with the field, in particular any precipitated or pyrogenic silica having a BET surface area and a specific CTAB surface area, both of which are less than 450 $m^2/g$, preferably from about 30 to 400 $m^2/g$. Highly dispersible precipitated silicas (known as "HD" silicas) are preferred, especially when the invention is implemented for the manufacture of tires with a low rolling resistance. As is known, a highly dispersible silica is any silica having a very substantial ability to disagglomerate and to disperse in an elastomeric matrix, which can be observed in a known way by electron or optical microscopy on thin sections. Non-limiting examples of such preferred highly dispersible silicas may include: the silica Perkasil KS 430 commercially available from Akzo; the silica BV 3380 commercially available from Degussa; the silicas Zeosil 1165 MP and 1115 MP commercially available from Rhodia; the silica Hi-Sil 2000 commercially available from PPG; the silicas Zeopol 8741 or 8745 commercially available from Huber; and treated precipitated silicas such as, for example, the aluminum-"doped" silicas described in patent application EP 0 735 088.

The reinforcing alumina used preferentially is a highly dispersible alumina with a BET surface area of between about 30 and 400 m²/g, preferably between 60 and 250 m²/g, and a mean particle size of up to 500 nm, and more preferably not exceeding 200 nm, as described in the patent application EP 0 810 258 mentioned earlier. Non-limiting examples of such reinforcing aluminas may include the aluminas A125, CR125 and D65CR commercially available from Baïkowski.

The physical state in which the reinforcing white filler is present is immaterial, whether it be in the form of a powder, microbeads, granules or, alternatively, balls. Of course, "reinforcing white filler" is also understood to mean mixtures of different reinforcing white fillers, in particular of highly dispersible silicas and/or aluminas such as those described above.

When the compositions of the present invention are used in tire treads, the white filler used, especially in the case of silica, preferably has a BET surface area of between 60 and 250 m²/g and better still between 80 and 200 m²/g.

The reinforcing white filler may also be used in a blend or a mixture with carbon black. Suitable carbon blacks are all the carbon blacks, in particular the blacks of the type HAF, ISAF and SAF, which are conventionally used in tires and particularly in tire treads. Non-limiting examples of such carbon blacks may include the carbon blacks N115, N134, N234, N339, N347 and N375. The amount of carbon black in the total reinforcing filler may vary within wide limits, wherein the amount of carbon black preferably is less than the total amount of reinforcing white filler in the rubber composition.

Preferably, the total content of reinforcing filler (reinforcing white filler plus carbon black, if present) is between 10 and 200 phr, preferably between 20 and 150 phr, the optimum value being different depending on the applications envisioned. For example, as is known, the level of reinforcement expected of a bicycle tire, for example, is distinctly lower than that required for a tire capable of travelling at a sustained high speed, for example a motorcycle tire, a passenger-vehicle tire or a tire for a utility vehicle such as a heavy duty vehicle.

For treads for tires which are appropriate for travel at high speed, the quantity of white filler, especially in the case if silica, is preferably between 30 and 120 phr, and better still between 40 and 100 phr.

In the present invention, the BET specific surface area is determined in a known way, in accordance with the method of Brunauer, Emmet and Teller described in *The Journal of the American Chemical Society*, Vol. 60, page 309, February 1938, which corresponds to the Standard AFNOR-NFT-45007 (November 1987); the CTAB specific surface area is the external surface area determined in accordance with the same Standard AFNOR-NFT-45007 of November 1987.

As is known and as has already been explained, a (white filler/diene elastomer) coupling agent has at least two functions, here denoted as "Y" and "X", which enable it to bond on the one hand to the reinforcing white filler by means of the Y function and on the other hand to the diene elastomer by means of the X function.

An essential characteristic of the coupling agent used in the rubber compositions of the invention is that its X function consists of an ester function of an unsaturated α-β acid bearing a carbonyl group on its γ position and having the general formula (X):

wherein R, $R^1$ and $R^2$ may be identical or different and each of them represents a monovalent hydrocarbon radical, preferably chosen from among the linear or branched alkyl radicals with 1 to 6 carbon atoms, or in the case of $R^1$ and $R^2$, also a hydrogen atom.

The Y function of this coupling agent is advantageously an alkoxysilyl function. As is known, the term "alkoxysilyl function" means one or more (OR') group(s) fixed to a silicon atom, where R' is a monovalent, linear or branched hydrocarbon group. R' preferably contains from 1 to 18 carbon atoms, and is preferably chosen from among the alkyls with $C_1$–$C_{18}$, the alkoxyalkyls with $C_2$–$C_{18}$, the cycloalkyls with $C_5$–$C_{18}$ or the aryls with $C_6$–$C_{18}$, in particular among the alkyls with $C_1$–$C_6$, the alkoxyalkyls with $C_2$–$C_6$, the cycloalkyls with $C_5$–$C_8$ or a phenyl radical.

As examples of X functions having the general formula (X), particularly suitable are the maleamic-ester functions having the formula (I) or the fumaramic-ester functions having the formula (II) shown below:

wherein: $R^3$ is a divalent, linear or branched alkylene hydrocarbon radical, preferably having from 1 to 10 carbon atoms; $R^4$, $R^5$ and $R^6$, which may be identical to or different from one another, each represent a hydrogen atom or a monovalent hydrocarbon group, preferably chosen from among the linear or branched alkyls having between 1 and 6 carbon atoms, or a phenyl radical; and $R^7$ is a monovalent hydrocarbon group, preferably chosen from among the linear or branched alkyls having between 1 and 6 carbon atoms, or a phenyl radical.

Thus, as a suitable and advantageous coupling agent for the implementation of the present invention, and without the definition below being limiting, it is possible to use an alkoxysilane coupling agent having the general formula (III) shown below:

(III)

wherein: the symbols R', which may be identical to or different from one another, each represent a monovalent hydrocarbon group chosen from among the linear or branched alkyls having from 1 to 4 carbon atoms, the linear or branched alkoxyalkyls having from 2 to 6 carbon atoms, the cycloalkyls having from 5 to 8 carbon atoms, or a phenyl radical; the symbols R", which may be identical to or different from one another, each represent a monovalent hydrocarbon group chosen from among the linear or branched alkyls having from 1 to 6 carbon atoms, the cycloalkyls having from 5 to 8 carbon atoms, or a phenyl radical; Z=-L-X, where L, connected to the silicon atom, is a linear or branched divalent binding group preferably having from 1 to 16 carbon atoms, and optionally comprising one or more heteroatoms preferably chosen from among S, O or N; and a is equal to 1, 2 or 3.

Those familiar with the field will easily understand that in the general formula (III) above, the alkoxysilyl function (Y function) mentioned above is symbolized by the group $(R'O)_a$ attached to the silicon atom, while the connecting group L is the chain necessary to connect the original silane to the ester of the acid that determines the formula (for example: L=—$R^3$—$NR^4$— for formulas I and II shown above).

Formulas I, II and III above will preferably conform to the following characteristics:

the radicals R' of formula (III) are chosen from among the radicals: methyl, ethyl, n-propyl, isopropyl, n-butyl, $CH_3OCH_2$—, $CH_3OCH_2CH_2$—, $CH_3OCH(CH_3)CH_2$—;

the radicals R" of formula (III) are chosen from among the radicals: methyl, ethyl, n-propyl, isopropyl, n-butyl, n-pentyl, cyclohexyl or phenyl;

the radical $R^3$ of formulas (I) or (II) represents an alkylene residue with the following formulas: —$(CH_2)_2$—, —$(CH_2)_3$—, —$(CH_2)_4$—, —$CH_2$—$CH(CH_3)$—, —$(CH_2)_2$—$CH(CH_3)$—$(CH_2)$—, —$(CH_2)_3$—O—$(CH_2)_3$—, or —$(CH_2)_3$—O—$CH_2$—$CH(CH_3)$—$CH_2$—;

the radicals $R^4$, $R^5$ and $R^6$ of formulas (I) or (II) are chosen from among hydrogen or the methyl, ethyl, n-propyl, isopropyl or n-butyl radicals; and the radical $R^7$ of formulas (I) or (II) is chosen from among the radicals methyl, ethyl, n-propyl or isopropyl.

More preferably still, the following characteristics will be satisfied:

the radicals R' of formula (III) are chosen from among the methyl, ethyl, n-propyl and isopropyl radicals;

the radicals R" of formula (III) are methyl radicals;

$R^3$ of formulas (I) or (II) is a —$(CH_2)_2$— or —$(CH_2)_3$— residue;

the radicals $R^4$, $R^5$ and $R^6$ of formulas (I) or (II) are chosen from among hydrogen or a methyl radical; and the radical $R^7$ of formulas (I) or (II) is a methyl radical.

A preferred example of such a silane having a general formula (III) may include the alkoxysilane with formula (III-1) below:

(III-1)

wherein: L=—$R^3$—$NR^4$— (according to formulas I and II above); and X is the maleamic-ester function with formula (I), or the fumaramic-ester function with formula (II) shown above.

Preferred compounds having the formula (III-1) above may include the methyl ester of N-[γ-propyl(methyl-diethoxy)silane] maleamic acid (formula III-2 below), or the methyl ester of N-[γ-propyl(methyl-diethoxy)silane] fumaramic acid (formula III-3 below):

(III-2)

(III-3)

i.e. a coupling agent wherein:

a=2;

L=—$(CH_2)_3$—NH—;

X=—CO—CH=CH—$COOCH_3$; and

Z=-L-X=—$(CH_2)_3$—NH—CO—CH=CH—$COOH_3$.

The functionalized silanes with general formula (III) above, and in particular those with the particular formula (III-2) or (III-3) above, which possess maleamic- or fumaramic-ester functions, have shown very good reactivity with respect to the diene elastomers used in rubber compositions for tires.

They can be prepared according to a preferred route of synthesis, by formation of an amide function by adding an aminated silane (1) to an activated ester derivative (6) obtained from a mono-ester of maleic acid (5), in the following stages:

(1) alcoholysis of maleic anhydride (2) by the alcohol $R^7$—OH, (2) activation of the carboxylic acid function of the mono-ester of maleic acid (5) obtained, by using the various activation methods described in the field of peptide synthesis, to give the activated ester derivative (6), and then (3) addition of the aminated silane (1) to the activated ester derivative (6) to give the compound consisting essentially of the functionalized organosilane desired (4), by applying the following synthesis scheme (in which the symbol A of the derivative (6) represents an activating function):

With regard to the practical way in which stages (1) to (3) can be carried out, for more details reference should be made to the following documents which describe, sometimes starting with other reagents, the operative modes applicable in carrying out the various stages of the synthesis process considered: for stage (1), *J. Med. Chem.*, 1983, 26, pages 174–181; and for stages (2) and (3), John Jones, *Amino Acid and Peptide Synthesis*, pages 25–41, Oxford University Press, 1994.

To enable the addition of the amine function to the carboxylic acid function of the mono-ester of maleic acid (5), it is best to activate the said carboxylic acid function in advance.

This activation can be effected in particular by adopting the following methods:

(i) activation by reaction with an alkylchloroformiate, according to the scheme below (activating function located on the right of the T-CO— group, namely in the present case, —O—CO—OR$^8$):

wherein T represents the residue —R$^5$C=CR$^6$—COOR$^7$ and R$^8$ represents a linear alkyl radical having, for example, 1 to 3 carbon atoms;

(2i) activation by reaction with dicyclohexylcarbodimide (DCCI) in the presence preferably of N-hydroxysuccinimide (HO—SN), according to the scheme:

(3i) activation by reaction with a chlorinated compound such as thionyl chloride or phosphorus pentachloride, according to the scheme (activating function: —Cl):

Activation methods (i) and (2i) are especially preferred.

As concrete examples of organoaminosilanes (1), those with the formulas given below may be mentioned:

$(C_2H_5O)_2CH_3Si(CH_2)_3NH_2$
$(C_2H_5O)_3Si(CH_2)_3NH_2$
$(CH_3O)_2CH_3Si(CH_2)_3NH_2$
$(CH_3O)_3Si(CH_2)_3NH_2$
$(CH_3O)_3Si(CH_2)_4NH_2$
$(C_2H_5O)_3Si(CH_2)_4NH_2$
$(CH_3O)_2CH_3SiCH_2CH_2CH(CH_3)CH_2NH_2$
$(CH_3O)_3Si(CH_2)_3O(CH_2)_3NH_2$.

The components C described above, which have an alkoxysilyl function and an ester function with formula (X), have been shown to be effective enough on their own and may advantageously constitute the only coupling agent present in the compositions of the invention.

The content of component C is preferably between 0.5% and 20% by weight relative to the weight of reinforcing white filler. Below the minimum amounts indicated, the effect risks being inadequate, whereas beyond the maximum amounts indicated, generally no further improvement in the coupling is observed, whereas the costs of the composition increase. For these reasons, the content of component C is preferably between 3 and 15% by weight relative to the weight of the reinforcing white filler, and better still, between 5 and 12%.

Those familiar with the field will understand how to adjust the content of component C as a function of the application envisioned, the nature of the elastomer used and the quantity of reinforcing white filler.

To reduce the costs of rubber compositions, it is desirable to use as little as possible, that is, only as much as is necessary to ensure sufficient coupling between the diene elastomer and the reinforcing white filler. In many cases, the efficacy of the X function selected allows the component C to be used in a preferred amount less than 10% and better still less than 8% relative to the weight of the reinforcing white filler.

Additionally, the coupling agent (component C) described above could be bonded beforehand (via the function "Y") to the reinforcing white filler, and the "pre-coupled" filler so obtained can subsequently be bonded to the diene elastomer by means of the free function "X".

The rubber compositions according to the present invention also contain all or part of the additives usually used in diene rubber compositions intended for the manufacture of tires, such as, for example, plasticizers, protective agents, a cross-linking system based either on sulfur or on sulfur donors, vulcanization accelerators, extender oils, etc. The reinforcing white filler may also, if necessary, be associated with a conventional white filler with little or no reinforcing action, such as particles of clay, bentonite, talc, chalk, kaolin or titanium oxides.

The rubber compositions according to the invention may also contain, in addition to the coupling agents (component C) described earlier, covering agents (comprising, for example, the single Y function) for the reinforcing white filler, or more generally, processing aids liable, in a known way, owing to an improvement in the dispersion of the white filler in the rubber matrix and to a reduction in the viscosity of the compositions, to improve their ability to be worked in the uncured state. These agents may include, for example, alkylalkoxysilanes (in particular alkyltriethoxysilanes), polyols, polyethers (for example polyethylene glycols), primary, secondary or tertiary amines (for example trialcanolamines), and hydroxylated or hydrolyzable polyorganosiloxanes, for example, α,ω-dihydroxy-polyorganosiloxanes (in particular α,ω-dihydroxy-polydimethylsiloxanes). The compositions according to the present invention could also contain coupling agents other than those corresponding to component C, for example polysulfurized alkoxysilanes.

The rubber compositions of the present invention are produced in appropriate mixers, using two successive preparation phases well-known to those familiar with the field: a first phase of thermo-mechanical working or kneading (sometimes referred to as the "non-productive" phase) at high temperature, up to a maximum temperature ($T_{max}$) of between 110° C. and 190° C., preferably between 130° C. and 180° C., followed by a second phase of mechanical working (sometimes referred to as the "productive" phase) at lower temperature, typically less than 110° C., for example between 60° C. and 100° C., during which finishing phase the cross-linking or vulcanization system is incorporated; such phases have been described, for example, in the aforementioned patent application EP 0 501 227.

The production process according to the invention is characterized in that at least component B and component C are incorporated by kneading into component A during the first, so-termed non-productive phase, i.e. at least these different basic constituents are introduced into the mixer and kneaded thermo-mechanically in one or more stages until a maximum temperature between 110° C. and 190° C. and preferably between 130° C. and 180° C. is reached.

By way of example, the first (non-productive) phase is effected in a single thermo-mechanical step during which all the basic constituents necessary, including the coupling system according to the invention, any additional covering agents or processing agents, and various other additives, with the exception of the vulcanization system, are introduced into a suitable mixer, such as a conventional internal mixer. A second stage of thermo-mechanical working may follow in this internal mixer, after the mixture has dropped and after intermediate cooling (preferably to a temperature of less than 100° C.), with the aim of making the compositions undergo complementary heat treatment, in particular in order to improve further the dispersion of the reinforcing white filler and its coupling agent in the elastomeric matrix. The total duration of the kneading in this non-productive phase is preferably between 2 and 10 minutes.

After cooling of the mixture so obtained, the vulcanization system is then incorporated at low temperature, generally in an external mixer such as an open mill; the entire composition is then mixed (productive phase) for several minutes, for example between 5 and 15 minutes.

The final composition so obtained is then calendered, for example, in the form of a sheet, a plate or, alternatively, a rubber profiled element which can be used for the manufacture of semi-finished products such as treads.

The vulcanization (or curing) is carried out in a known way at a temperature generally between 130° C. and 200° C., for a sufficient time which may vary, for example, between 5 and 90 minutes depending, in particular, on the curing temperature, the vulcanization system adopted and the vulcanization kinetics of the composition in question.

The present invention relates to the rubber compositions previously described, both in the state termed "raw" (i.e. before curing) and in the state termed "cured" or vulcanized (i.e. after cross-linking or vulcanization).

The compositions according to the present invention may be used alone or in a blend (i.e. mixed) with any other rubber composition that is useful for manufacturing tires.

The present invention may be better understood through the Examples below. These Examples are intended to illustrate the invention and should not be construed as limiting the invention in any way.

EXAMPLES

Example 1

Synthesis of the Coupling Agent

This example describes the preparation of coupling agents with formula (III) comprising a maleamic-ester or fumaramic-ester function. The synthesis is carried out as follows, via the intermediary of an activated ester derivative.

Alcoholysis of maleic anhydride: In a 2-liter tetracol reactor, maleic anhydride is introduced (698.1 g, or 7.12 moles) and then melted by heating the reactor on an oil bath at 70° C. Once all the anhydride has melted, methanol (221.4 g or 6.92 moles) is introduced with stirring, from a dropping funnel. The medium is stirred for 20 hours at 23° C., then devolatilized by establishing a reduced pressure of $10.10^2$ Pa for one hour, and then filtered through filter paper. This gives 786.9 g of maleic acid monomethyl ester (yield: 86%) having the formula:

Preparation of the activated ester derivative followed by coupling with the aminated silane: In a 2-liter tricol reactor equipped with a mechanical stirrer and refrigeration and placed under an argon atmosphere, the maleic acid monoester (219.17 g or 1.685 moles) is introduced and dissolved in dichloromethane $CH_2Cl_2$ (950 g). The reaction medium is cooled to −60° C. and N-methylmorpholine (187.58 g or 1.854 moles) is then added gradually over a period of 4 minutes. At the end of this time, operating at the same temperature of −60° C., ethylchloroformiate Cl—CO—OC$_2$H$_5$ (201.21 g or 1.854 moles) is added gradually over a period of 10 minutes.

The reaction medium so obtained, which contains the activated ester derivative with formula:

is left to stand for 10 minutes at the temperature it is at.

Then, the aminated silane with formula $(C_2H_5O)_2CH_3Si(CH_2)_3NH_2$ (322.43 g or 1.685 moles) is run in gradually over 15 minutes from a dropping funnel. Stirring of the reaction mixture is continued while the temperature is allowed to increase slowly to ambient temperature 23° C. Once ambient temperature has been reached, stirring is continued for 2 hours at that temperature, and the mixture is then filtered through sintered glass and the solvent is finally eliminated by evaporation.

The residual compound so obtained is then purified by chromatography on silica gel, using as eluent a heptane/ethyl acetate mixture (50/50 by volume); the eluent is finally eliminated by evaporation.

The purified compound so obtained is subjected to analysis by proton NMR and NMR of the silicon ($^{29}$Si), which reveal that the compound consists of:

approximately 82 mole-% of units coded as $D(OC_2H_5)_2$ having the formula $CH_3ZSi(OC_2H_5)_2$ which belong to the silane with the maleamic-ester function of formula (III-2) shown below (which is present in an amount of 83.2% by weight):

(III-2)

approximately 9 mole-% of units coded as $D(OC_2H_5)_2$ having the formula $CH_3ZSi(OC_2H_5)_2$ which belong to the silane with the fumaramic-ester function of formula (III-3) shown below (present in an amount of 9.2% by weight):

(III-3)

and approximately 9 mole-% of units coded as $D(OC_2H_5)$ and D having formulas $CH_3Z$ $(OC_2H_5)SiO_{1/2}$ and $CH_3ZsiO_{2/2}$ which belong to the oligomer with the following formula (present in an amount of 7.6% by weight):

and consequently, for these three formulas:

Z=—(CH$_2$)$_3$—NH—CO—CH=CH—COOCH$_3$ or L=—(CH$_2$)$_3$—NH— and X=—CO—CH=CH—COOCH$_3$.

Example 2

Preparation of the Rubber Compositions

For the following tests, the procedure is as follows: the diene elastomer or the mixture of diene elastomers, the reinforcing filler, the coupling system according to the invention, and then the various other ingredients, with the exception of the vulcanization system, are introduced into an internal mixer filled to 70% capacity, the initial tank temperature of which is approximately 60° C. Thermo-mechanical working (non-productive phase) is then performed in two stages (total duration of kneading: around 7 minutes), until a maximum "dropping" temperature of about 165° C. is obtained. The mixture so obtained is recovered, cooled, and then sulfur and sulfenamide are added in an external mixer (homo-finisher) at 30° C., and everything is mixed together (productive phase) for 3 to 4 minutes.

The compositions so obtained are then calendered either in the form of sheets (thickness of 2 to 3 mm) or thin films of rubber in order to measure their physical or mechanical properties, or in the form of profiled elements, which can be used directly, after cutting out and/or assembly to the dimensions desired, for example as semi-finished products for tires, in particular as treads.

In the following tests, the reinforcing white filler (silica and/or alumina) constitutes the entire reinforcing filler, which is used in a preferred proportion of between 30 and 80 phr; however, a fraction of the reinforcing filler, preferably a minority fraction, could be replaced by carbon black.

Example 3

Characterization Tests

Test 1: The purpose of this test is to demonstrate the improved (white filler/diene elastomer) coupling performance in a composition according to the invention, compared with a composition of the prior art using a conventional TESPT coupling agent.

For this, two rubber compositions are prepared, based on natural rubber and reinforced with silica (highly dispersible precipitated silica), the said compositions being intended for truck tire treads.

These two compositions are identical except for the following differences:

composition No. 1: conventional TESPT coupling agent;
composition No. 2: coupling agent synthesized as above, for the most part (82 mol-%) consisting of the methyl ester of N-[γ-propyl(methyl-diethoxy)silane] maleamic acid (formula III-2).

The two coupling agents tested are used in isomolar amounts of silicon, that is to say, whatever the composition tested, the same number of Y functions (Y=Si(OR')$_a$; a=1, 2 or 3) reactivated with respect to the silica and its surface hydroxyl groups are present.

Relative to the weight of reinforcing white filler, the content of TESPT and that of the maleamic acid ester are in both cases less than 10%.

Tables 1 and 2 below show the formulation of the different compositions (Table 1—amount of the different products expressed in phr), and their properties before and after curing (25 min at 150° C.).

TABLE 1

| Composition No.: | 1 | 2 |
|---|---|---|
| NR (1)* | 100 | 100 |
| silica (2)* | 50 | 50 |
| silane (3)* | 4 | — |
| silane (4)* | — | 4.5 |
| ZnO | 3 | 3 |
| stearic acid | 2.5 | 2.5 |
| antioxidant (5)* | 1.9 | 1.9 |

TABLE 1-continued

| Composition No.: | 1 | 2 |
|---|---|---|
| sulfur | 1.5 | 1.5 |
| CBS (6)* | 1.8 | 1.8 |

(1)* natural rubber;
(2)* silica of type "HD"-Zeosil 1165MP manufactured by Rhodia in the form of micropearls (BET and CTAB: approximately 150–160 m$^2$/g);
(3)* coupling agent TESPT-Si69 manufactured by Degussa;
(4)* coupling agent with the maleamic ester function (formula III-2);
(5)* N-1,3-dimethylbutyl-N-phenyl-para-phenylenediamine;
(6)* N-cyclohexyl-2-benzothiazyl sulfenamide.

TABLE 2

| Composition No.: | 1 | 2 |
|---|---|---|
| Properties before curing: | | |
| Mooney (MU) | 33 | 40 |
| T5 (min) | 21 | 22 |
| Properties after curing: | | |
| M10 (MPa) | 5.10 | 7.30 |
| M100 (MPa) | 1.74 | 2.23 |
| M300 (MPa) | 1.76 | 2.60 |
| M300/M100 | 1.01 | 1.17 |
| Breaking stress (MPa) | 31 | 31 |
| Elongation at break (%) | 620 | 540 |

FIG. 1 shows the curves of modulus (in MPa) as a function of the elongation (in %), these curves being marked C1 and C2, and corresponding to Compositions No. 1 and No. 2 respectively. The vulcanization system consists of sulfur and sulfenamide.

A study of these various results leads to several observations. The scorching times (T5) are long enough in all cases (over 20 min), and this offers a large safety margin in relation to the scorching problem. The Mooney plasticity values remain low (appreciably under 50 MU), whatever the composition considered, which indicates a very good ability of the compositions to be processed in the uncured state. After curing, the composition according to the invention (C2) shows higher modulus values, especially at high deformations (M100 and M300), and a higher (M300/M100) ratio, these indexes being known to those familiar with the field as showing the quality of the reinforcement provided by the white filler. It must be deduced that the increase of the Mooney viscosity (+7 points) observed in the composition according to the invention is due to the formation, during thermo-mechanical kneading, of additional bonds between the white filler and the diene elastomer, in other words, due to better (white filler/elastomer) coupling.

The results shown in FIG. 1 confirm the preceding observations: the composition according to the invention (C2) shows a reinforcement level (modulus) that is higher regardless of the elongation, and in particular at high deformations (elongations of 100% and more). For such an elongation range, this behavior clearly illustrates a better quality of the bonding or coupling between the reinforcing white filler and the diene elastomer.

Test 2: This test confirms the results of the previous test in the case of compositions this time comprising, as the reinforcing white filler, a blend (50/50 by volume) of silica and alumina (the alumina being as described in patent application EP 0 810 258 cited earlier).

For this, two compositions are compared which are based on natural rubber and are also intended for the treads of truck tires; the 2 compositions are identical except for the following differences:

Composition No. 3: TESPT coupling agent (4 phr);
Composition No. 4: Coupling agent with a maleamic ester function (4.5 phr).

Composition No. 3 is therefore the reference composition, whereas Composition No. 4 is in accordance with the present invention. As before, the coupling agents are used in amounts containing isomolar quantities of triethoxysilane functions (same number of functions reactive with respect to the total white filler). Relative to the weight of white filler (65 phr), the content of coupling agent is in both cases less than 8%.

Tables 3 and 4 below show the formulation of the different compositions and their properties before and after curing (20 min at 150° C.).

TABLE 3

| Composition No.: | 3 | 4 |
|---|---|---|
| NR (1)* | 100 | 100 |
| silica (2)* | 25 | 25 |
| alumina (7)* | 40 | 40 |
| silane (3)* | 4 | — |
| silane (4)* | — | 4.5 |
| ZnO | 3 | 3 |
| stearic acid | 2.5 | 2.5 |
| antioxidant (5)* | 1.9 | 1.9 |
| sulfur | 1.5 | 1.5 |
| CBS (6)* | 1.8 | 1.8 |

(1) to (6)* see Table 1;
(7)* alumina CR125 from Baïkowski (in the form of powder—BET: approximately 105 m$^2$/g).

TABLE 4

| Composition No.: | 3 | 4 |
|---|---|---|
| Properties before curing: | | |
| Mooney (MU) | 38 | 46 |
| T5 (min) | 12 | 10 |
| Properties after curing: | | |
| M10 (MPa) | 5.2 | 5.3 |
| M100 (MPa) | 3.3 | 3.0 |
| M300 (MPa) | 6.7 | 7.1 |
| M300/M100 | 2.0 | 2.4 |
| Breaking stress (MPa) | 30 | 29 |
| Elongation at break (%) | 625 | 573 |

FIG. 2 shows the curves of modulus (in MPa) as a function of the elongation (in %), these curves being marked C3 to C4, and corresponding to Compositions No. 3 to No. 4 respectively.

Examination of the results in Table 4 confirms the advantages of the composition according to the invention. In particular, safety against scorching is sufficient in both cases (T5 at least equal to 10 min). Also, Mooney plasticity is low enough in both cases (less than 50 MU), indicating a very good ability to be processed in the uncured state. The modulus values under high deformation (M300) and the (M300/M100) ratio are both higher for the composition according to the invention, indicating better reinforcement. The plasticity increase (+8 points) for the composition of the invention is attributable to the formation of additional bonds between the filler and the elastomer during the kneading operations. Also, the properties at break are equivalent.

FIG. 2 clearly confirms the above observations: although, to be sure, the curves C3 and C4 are essentially superposed for elongations of 100 to 300%, it is evident that compared with the reference curve C3, curve C4 shows a higher reinforcement level (modulus) at higher deformations (elongation of 300% and more), indicating a better bond between filler and elastomer.

Test 3: This test illustrates another preferred embodiment of the invention, in which the above coupling agent with the maleamic ester function (component C) is associated, as an agent for covering the reinforcing white filler, with an α, ω-dihydroxy-polyorganosiloxane, notably in accordance with the proposal in patent application EP 0 784 072.

The functionalized polyorganosiloxane is incorporated in the composition according to the invention at the same time as the organosilane coupling agent (non-productive stage), to improve the processability in the uncured state (by lowering the viscosity) and the dispersion of the white filler in the elastomer matrix.

For this test, two compositions are compared, which are identical apart from the following differences:

composition No. 5 (reference): coupling agent TESPT (4 phr);

composition No. 6 (invention): coupling agent with the maleamic ester function (3 phr) plus polyorganosiloxane (1.2 phr).

Relative to the reinforcing white filler, the composition according to the invention advantageously contains less than 8% (to be precise, 6%) of coupling agent.

Tables 5 and 6 below show the formulation of the different compositions and their properties before and after curing (150 min at 30° C.).

TABLE 5

| Composition No.: | 5 | 6 |
|---|---|---|
| NR (1)* | 100 | 100 |
| silica (2)* | 50 | 50 |
| silane (3)* | 4 | — |
| silane (4)* | — | 3 |
| PDMS (8)* | — | 1.2 |
| ZnO | 3 | 3 |
| stearic acid | 2.5 | 2.5 |
| antioxidant (5)* | 1.9 | 1.9 |
| sulfur | 1.5 | 1.5 |
| CBS (6)* | 1.8 | 1.8 |

(1) to (6)* see Table 1;
*(8) covering agent: α,ω-dihydroxy-polydimethylsiloxane (oil H48V50 from Rhodia).

TABLE 6

| Composition No.: | 5 | 6 |
|---|---|---|
| Properties before curing: | | |
| Mooney (MU) | 36 | 32 |
| T5 (min) | 18 | 20 |
| Properties after curing: | | |
| M10 (MPa) | 5.2 | 7.2 |
| M100 (MPa) | 3.6 | 4.4 |
| M300 (MPa) | 7.6 | 10.5 |
| M300/M100 | 2.1 | 2.4 |
| Breaking stress (MPa) | 30 | 30 |
| Elongation at break (%) | 633 | 555 |

FIG. 3 shows the curves of modulus (in MPa) as a function of the elongation (in %), these curves being marked C5 and C6, and corresponding to Compositions No. 5 and No. 6 respectively.

A study of the different results shows that compared with the reference composition, composition No. 6 according to the invention has improved overall characteristics:

low Mooney plasticity in both cases;

equivalent or slightly better safety against scorching;

M100 and M300 moduli and (M300/M100) ratio appreciably higher, indicating better reinforcement and therefore improved coupling between the elastomer and the white filler; this is clearly confirmed by the curves of FIG. 3 (curve C6 is appreciably above curve C5, regardless of the elongation).

In conclusion, the coupling agent selected for the compositions according to the present invention imparts to those compositions particularly good mechanical properties at the same time as very good processability and improved hysteresis properties.

Not only does this coupling agent, because of its specific (X) function, show a performance distinctly superior to that of other known coupling agents of the type with activated ethylenic double bonds, but in addition, and unexpectedly, it shows appreciably higher efficacy than the polysulfurized alkoxysilane TESPT which is currently considered to be the best (white filler/elastomer) coupling agent in rubber compositions reinforced with a white filler such as silica.

The invention can be applied, particularly advantageously, in rubber compositions that can be used for the manufacture of tire treads having, at the same time, low rolling resistance and high wear resistance, especially when the treads are based on natural rubber or synthetic polyisoprene and are intended for use in the tires of industrial vehicles of the heavy-load type.

What is claimed is:

1. A tire comprising a rubber composition, wherein said rubber composition is based on a diene elastomer, a reinforcing white filler, and a (white filler/elastomer) coupling agent, bearing functions denoted as "Y" and "X", wherein said coupling agent can be bonded on the one hand to said reinforcing white filler by means of the Y function and on the other hand to said diene elastomer by means of the X function, and wherein the X function is an ester function of an unsaturated α-β acid bearing a carbonyl group on its γ position and having the general formula (X):

wherein R, R$^1$ and R$^2$ may be the same or different, wherein R represents a monovalent hydrocarbon radical, and wherein R$^1$ and R$^2$ each represent either a monovalent hydrocarbon radical or a hydrogen atom.

2. The tire of claim 1, wherein the diene elastomer is selected from the group of elastomers consisting of polybutadienes, natural rubber, synthetic polyisoprenes, copolymers of butadiene, copolymers of isoprene, and mixtures thereof.

3. The tire of claim 2, wherein the diene elastomer is selected from the group of elastomers consisting of natural rubber, synthetic polyisoprene, copolymers of isoprene, and mixtures thereof.

4. The tire of claim 3, wherein the diene elastomer is natural rubber or synthetic polyisoprene.

5. The tire of claim 1, wherein the coupling agent X function is a maleamic-ester function having the general formula (I):

or a fumaramic-ester function having the general formula (II):

wherein $R^3$ is a linear or branched, divalent alkylene radical having from 1 to 10 carbon atoms;

wherein $R^4$, $R^5$ and $R^6$ may be the same or different, and wherein each of $R^4$, $R^5$ and $R^6$ represents either a hydrogen atom or a monovalent hydrocarbon group selected from the group consisting of linear alkyls having from 1 to 6 carbon atoms, branched alkyls having from 1 to 6 carbon atoms, and a phenyl radical; and wherein $R^7$ is a monovalent hydrocarbon group selected from the group consisting of linear alkyls having from 1 to 6 carbon atoms, branched alkyls having from 1 to 6 carbon atoms, and a phenyl radical.

6. The tire of claim 5, wherein the radical $R^3$ represents an alkylene residue having one of the following formulas: $-(CH_2)_2-$, $-(CH_2)_3-$, $-(CH_2)_4-$, $-CH_2-CH(CH_3)-$, $-(CH_2)_2-CH(CH_3)-(CH_2)-$, $-(CH_2)_3-O-(CH_2)_3-$, or $-(CH_2)_3-O-CH_2-CH(CH_3)-CH_2-$; the radicals $R^4$, $R^5$ and $R^6$ are each selected from the group consisting of hydrogen and the following radicals: methyl, ethyl, n-propyl, isopropyl and n-butyl; and the radical $R^7$ is selected from the group consisting of methyl, ethyl, n-propyl and isopropyl.

7. The tire of claim 1, wherein the coupling agent is an alkoxysilane having the general formula (III):

wherein the radicals R' may be the same or different, and wherein the radicals R' each represent a monovalent hydrocarbon group selected from the group consisting of linear or branched alkyls having from 1 to 4 carbon atoms, linear or branched alkoxyalkyls having from 2 to 6 carbon atoms, cycloalkyls having from 5 to 8 carbon atoms, and a phenyl radical;

wherein the radicals R" may be the same or different, and wherein the radicals R" each represent a monovalent hydrocarbon group selected from the group consisting of linear or branched alkyls having from 1 to 6 carbon atoms, cycloalkyls having from 5 to 8 carbon atoms, and a phenyl radical;

wherein Z=-L-X, wherein L, which is connected to the silicon atom, is a linear or branched divalent connecting group having from 1 to 16 carbon atoms and optionally comprising one or more heteroatoms selected from the group consisting of S, O and N;

wherein X represents the coupling agent X function; and wherein a is equal to 1, 2 or 3.

8. The tire of claim 7, wherein:

the radicals R' are selected from the group consisting of methyl, ethyl, n-propyl, isopropyl, n-butyl, $CH_3OCH_2-$, $CH_3OCH_2CH_2-$, and $CH_3OCH(CH_3)CH_2-$;

the radicals R" are selected from the group consisting of methyl, ethyl, n-propyl, isopropyl, n-butyl, n-pentyl, cyclohexyl and phenyl.

9. The tire of claim 7, wherein the alkoxysilane has the formula (III1):

wherein $L=-R^3-NR^4-$; and wherein X represents the coupling agent X function.

10. The tire of claim 9, wherein the alkoxysilane is the methyl ester of N[γ-propyl(methyl-diethoxy)silane] maleamic acid having the formula (III-2):

11. The tire of claim 9, wherein the alkoxysilane is the methyl ester of N[γ-propyl(methyl-diethoxy)silane] fumaramic acid having the formula (III-3):

12. The tire of claim 1, wherein the reinforcing white filler is present in an amount of between 10 and 200 phr.

13. The tire of claim 1, wherein the reinforcing white filler comprises silica.

14. The tire of claim 1, wherein the reinforcing white filler comprises alumina.

15. The tire of claim 1, wherein the rubber composition further comprises carbon black.

16. A tire tread comprising a rubber composition, wherein the composition is based on a diene elastomer, a reinforcing white filler, and a (white filler/elastomer) coupling agent, bearing functions denoted as "Y" and "X", wherein said coupling agent can be bonded on the one hand to said reinforcing white filler by means of the Y function and on the other hand to said diene elastomer by means of the X function, and wherein the X function is an ester function of an unsaturated α-β acid bearing a carbonyl group on its γ position and having the general formula (X):

(X)

wherein R, R¹ and R² may be the same or different, wherein R represents a monovalent hydrocarbon radical, and wherein R¹ and R² each represent either a monovalent hydrocarbon radical or a hydrogen atom.

17. The tread of claim 16, wherein the diene elastomer is selected from the group of elastomers consisting of polybutadienes, natural rubber, synthetic polyisoprenes, copolymers of butadiene, copolymers of isoprene, and mixtures thereof.

18. The tread of claim 17, wherein the diene elastomer is selected from the group of elastomers consisting of natural rubber, synthetic polyisoprene, copolymers of isoprene, and mixtures thereof.

19. The tread of claim 18, wherein the diene elastomer is natural rubber or synthetic polyisoprene.

20. The tread of claim 16, wherein the coupling agent X function is a maleamic-ester function having the formula (I):

(I)

or a fumaramic-ester function having the general formula (II):

(II)

wherein R³ is a linear or branched, divalent alkylene radical having from 1 to 10 carbon atoms;

wherein R⁴, R⁵ and R⁶ may be the same or different, and wherein each of R⁴, R⁵ and R⁶ represents either a hydrogen atom or a monovalent hydrocarbon group selected from the group consisting of linear alkyls having from 1 to 6 carbon atoms, branched alkyls having from 1 to 6 carbon atoms, and a phenyl radical; and wherein R⁷ is a monovalent hydrocarbon group selected from the group consisting of linear alkyls having from 1 to 6 carbon atoms, branched alkyls having from 1 to 6 carbon atoms, and a phenyl radical.

21. The tread of claim 20, wherein the radical R³ represents an alkylene residue having one of the following formulas: —(CH₂)₂—, —(CH₂)₃—, —(CH₂)₄—, —CH₂—CH(CH₃)—, —(CH₂)₂—CH(CH₃)—(CH₂)—, —(CH₂)₃—O—(CH₂)₃—, or —(CH₂)₃—O—CH₂—CH(CH₃)—CH₂—; the radicals R⁴, R⁵ and R⁶ are each selected from the group consisting of hydrogen and the following radicals: methyl, ethyl, n-propyl, isopropyl and n-butyl; and the radical R⁷ is selected from the group consisting of methyl, ethyl, n-propyl and isopropyl.

22. The tread of claim 16, wherein the coupling agent is an alkoxysilane having the general formula (III):

(III)

wherein the radicals R' may be the same or different, and wherein the radicals R' each represent a monovalent hydrocarbon group selected from the group consisting of linear or branched alkyls having from 1 to 4 carbon atoms, linear or branched alkoxyalkyls having from 2 to 6 carbon atoms, cycloalkyls having from 5 to 8 carbon atoms, and a phenyl radical;

wherein the radicals R" may be the same or different, and wherein the radicals R" each represent a monovalent hydrocarbon group selected from the group consisting of linear or branched alkyls having from 1 to 6 carbon atoms, cycloalkyls having from 5 to 8 carbon atoms, and a phenyl radical;

wherein Z=-L-X, wherein L, which is connected to the silicon atom, is a linear or branched divalent connecting group having from 1 to 16 carbon atoms and optionally comprising one or more heteroatoms chosen from the group consisting of S, O and N;

wherein X represents the coupling agent X function; and wherein a is equal to 1, 2 or 3.

23. The tread of claim 22, wherein:

the radicals R' are selected from the group consisting of methyl, ethyl, n-propyl, isopropyl, n-butyl, CH₃, OCH₂—, CH₃OCH₂CH₂—, and CH₃OCH(CH₃)CH₂—;

the radicals R" are selected from the group consisting of methyl, ethyl, n-propyl, isopropyl, n-butyl, n-pentyl, cyclohexyl and phenyl.

24. The tread of claim 22, wherein the alkoxysilane has the formula (III-1):

(III-1)

wherein L=—R³—NR⁴—; and wherein X represents the coupling agent X function.

25. The tread of claim 24, wherein the alkoxysilane is the methyl ester of N[γ-propyl(methyl-diethoxy)silane] maleamic acid having the formula (III-2):

(III-2)

26. The tread of claim 24, wherein the alkoxysilane is the metal ester of N[γ-propyl(methyl-diethoxy)silane] fumaramic acid having the formula (III-3):

(III-3)

27. The tread of claim 16, wherein the reinforcing white filler is present in an amount of between 10 and 200 phr.

28. The tread of claim 16, wherein the reinforcing white filler comprises silica.

29. The tread of claim 16, wherein the reinforcing white filler comprises alumina.

30. The tread of claim 16, wherein the rubber composition further comprises carbon black.

* * * * *